United States Patent [19]
Zane et al.

[11] Patent Number: 5,127,562
[45] Date of Patent: Jul. 7, 1992

[54] MOUNTING BRACKET FOR U-LOCKS

[75] Inventors: Michael S. Zane, Brookline; Peter L. Zane, Hingham, both of Mass.

[73] Assignee: Kryptonite Corporation, Boston, Mass.

[21] Appl. No.: 526,973

[22] Filed: May 22, 1990

[51] Int. Cl.⁵ .......................................... B62J 11/00
[52] U.S. Cl. ...................................... 224/39; 224/37; 248/316.2; 70/233
[58] Field of Search .................. 224/37, 38, 39, 41; 248/316.2, 316.3; 70/233; 24/510; 269/231, 235, 236

[56] References Cited

U.S. PATENT DOCUMENTS

| | | | |
|---|---|---|---|
| 632,858 | 9/1899 | Waibel et al. | 224/39 |
| 1,306,585 | 6/1919 | Droege et al. | 248/316.3 |
| 1,550,549 | 8/1925 | Langlotz | 248/316.3 |
| 1,629,859 | 5/1927 | Burke . | |
| 1,736,290 | 11/1929 | Schiff | 24/510 |
| 2,370,876 | 3/1945 | Richardson | 248/316.3 |
| 2,483,012 | 9/1949 | Koon | 248/316.2 |
| 3,756,008 | 9/1973 | Smith | 57/139 |
| 3,800,570 | 4/1974 | Kaplan | 70/18 |
| 3,924,426 | 12/1975 | Zane et al. | 70/18 |
| 3,967,475 | 7/1976 | Zane | 70/18 |
| 4,155,231 | 5/1979 | Zane et al. | 70/18 |
| 4,256,322 | 4/1981 | Otsuka et al. | 280/289 |
| 4,271,690 | 6/1981 | Jaulmes | 70/233 |
| 4,426,861 | 1/1984 | Chillis | 70/39 |
| 4,436,232 | 3/1984 | Zane et al. | 224/39 |
| 4,477,865 | 10/1984 | Tsuyama | 248/316.2 |
| 4,545,224 | 10/1985 | Zane | 70/39 |
| 4,730,470 | 3/1988 | Zane et al. | 70/238 |
| 4,736,921 | 4/1988 | Zane et al. | 248/316.2 |

FOREIGN PATENT DOCUMENTS

| | | | |
|---|---|---|---|
| 2836530 | 3/1980 | Fed. Rep. of Germany | 70/233 |
| 8105108 | 6/1983 | Netherlands | 224/39 |
| 1048760 | 10/1965 | United Kingdom | 248/316.3 |

Primary Examiner—Linda J. Sholl
Attorney, Agent, or Firm—Morse, Altman, Dacey & Benson

[57] ABSTRACT

A universal mounting bracket for U-locks of the kind featuring a U-shaped shackle and a cross bar for securing motorcycles, scooters, mopeds and the like is disclosed. The universal mounting bracket is adjustable to mount U-locks of sizes varying from about 2" to about 6" as measured between the legs, as well as the legs ranging in lengths from about 5" to about 12", and with the thickness of the respective legs varying from about ½" to about ¾". Essentially, the universal mounting bracket includes a base plate, a vise removably attached thereto at one end, a cam member mounted thereto with limited rotational displacement at the other end, and means for securing the bracket to a motorcycle, scooter, moped or the like.

21 Claims, 5 Drawing Sheets

MOUNTING BRACKET FOR U-LOCKS

BACKGROUND OF THE INVENTION

1. Field of the Invention

The present invention relates generally to mounting brackets for U-locks and, more particularly, to a universal mounting bracket for a U-lock of the kind featuring a U-shaped shackle and a cross bar for securing motorcycles, bicycles, scooters, mopeds and the like against theft.

2. The Prior Art

The numbers of motorcycles, bicycles scooters, mopeds and the like in daily use have increased dramatically lately. Some of these items are now quite expensive. Thefts of these items also have increased dramatically. These items, once stolen, represent not only considerable loss to their owners, but also are difficult to trace and to recover. Professional and some not so professional thieves nowadays frequently employ a bolt cutter, a long lever or the like to sever or break quickly and quietly cables, chains or other devices used to secure bicycles and the like to posts or other fixed objects. To guard thereagainst, large heavy locks have been developed comprising rigid U-shaped shackles and cross bars designed to attach to the ends of the shackles.

The present invention pertains to a universal mounting bracket for such a rigid U-lock to securely hold it in place on a vehicle when the vehicle is in use and not the U-lock. A lock holder of this type is illustrated in U.S. Pat. No. 1,629,859 that was granted to Lot F. Burke on May 24, 1927. An early attempt at a combination bicycle lock and mounting bracket was disclosed in U.S. Pat. No. 3,9667,475 that was granted to one of the coinventors herein, Michael S. Zane on Jul. 6, 1976. An improvement thereof is shown in U.S. Pat. No. 4,155,231 granted to the coinventors Michael and Peter Zane on May 22, 1979. Another combined carrying and locking device for a cycle is disclosed in U.S. Pat. No. 4,256,322. An interesting antitheft device for bicycles is disclosed in U.S. Pat. No. 4,271,690 that issued to Jaulmes on Jun. 9, 1981. A brake lock for motorcycles is shown in U.S. Pat. No. 4,426,861, and a further former bracket for a motorcycle lock by the inventors herein is disclosed in U.S. Pat. No. 4,436,232 granted on Mar. 13, 1984. A different clamp for releasably securing a U-shaped bicycle lock to a bicycle frame is disclosed in U.S. Pat. No. 4,736,921 that was granted to the within coinventors Michael and Peter Zane on Apr. 12, 1988. This patent No. 4,736,921 features, as far as known for the first time, the utilization of a hard resilient plastic material for the formation of the lock holder, representing a radical departure from making such lock holders from sheet metal. In fact, the within coinventors' then pending application Ser. No. 467,609 filed Feb. 18, 1983, entitled "Mounting Bracket for Bicycle Lock," was, in part, abandoned due to product obsolescence in view of the teaching of Pat. No. 4,736,921. A U.S. patent application intended to protect a more versatile version of a plastic fastener for releasably securing bicycle accessories to a bicycle frame has recently been filed by the coinventors herein on Mar. 7, 1990, Ser. No. 07/490,731.

SUMMARY OF THE INVENTION

It is a principal object of the present invention to overcome the shortcomings of prior art devices by providing a universal mounting bracket for rigid U-locks designed to accommodate U-locks of varying widths, lengths and thicknesses.

More specifically, it is an object of the present invention to provide a universal mounting bracket for U-locks of the kind formed of a U-shaped shackle and a cross bar for securing motorcycles, scooters, mopeds and the like to a post or the like and essentially comprising a base plate, a vise removably secured to the base plate at one end thereof, a cam member mounted to the base plate adjacent the other end thereof, and means for securing the mounting bracket to a motorcycle, scooter, moped or the like. The base plate is provided with a plurality of spaced mounting means allowing the securing of the vise thereto at varying distances from the cam member. Both the vise and the cam member are formed with opposed V-grooves designed to grip the rigid U-shaped shackle of a U-lock therebetween. Preferably, the cam member is mounted to the base plate for limited rotational displacement so as to allow for the easy and convenient gripping and releasing of the rigid U-shaped shackle of the U-lock from the opposed V-grooves of the vise and cam member. Preferably, a spring means is provided to urge the cam member into locking engagement with the rigid U-lock. Preferably, the means for securing the mounting bracket to the vehicle includes an extension arm mounted to the end of the base plate adjacent the cam member.

Other objects of the present invention will in part be obvious and will in part appear hereinafter.

The invention accordingly comprises the universal mounting bracket, for releasably mounting a rigid U-lock to a motorcycle or bicycle frame, of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENTS

Figure 1:
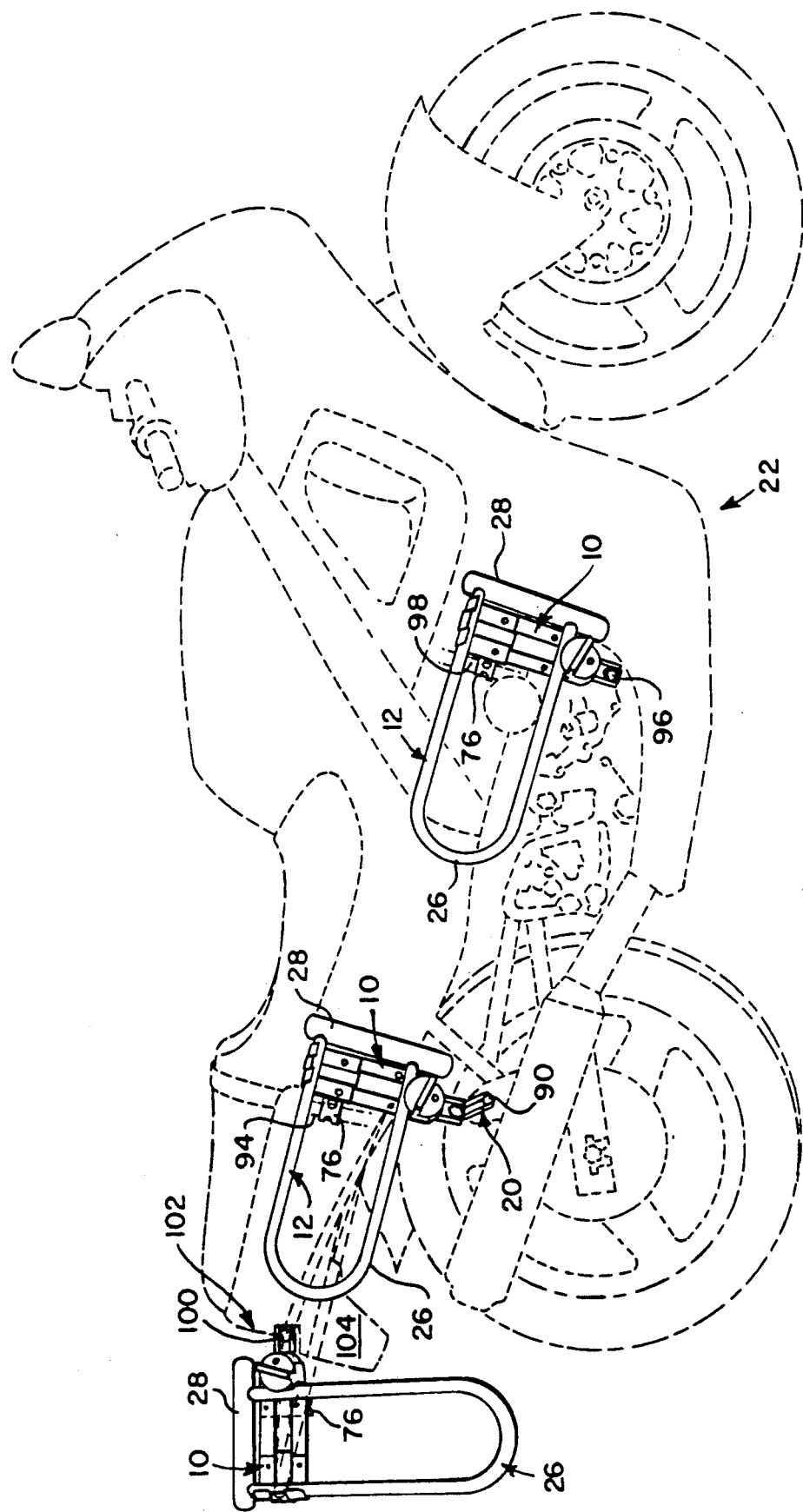
FIG. 1 is a view of a motorcycle in phantom lines and illustrating the mounting thereto, at three different locations, a universal mounting bracket constructed in accordance with the present invention and shown releasably securing a rigid U-lock to the motorcycle.

In general, the illustrated embodiment of a universal mounting bracket 10 for releasably holding a rigid U-lock 12 essentially comprises a base plate 14, a vise 16 removably attached to the base plate 14 at one end thereof, a cam member 18 mounted to the base plate 14 adjacent its other end, and means 20 for securing the mounting bracket 10 to a motorcycle 22, a scooter 24, a moped or the like.

As known, the rigid U-lock 12 is designed to secure the motorcycle 22, the scooter 24, a moped or a like vehicle to a fixed object when the vehicle is not in use and thus protect the same against theft. The U-lock 10 is of the kind featuring a rigid U-shaped shackle 26 and a cross bar 28. Also as known, such U-locks 10 preferably feature a shiny covering skin on the outer surfaces of both the shackle 26 and the cross bar 28 to protect the vehicles from being scratched thereby when they are secured to a stationary object, such as a post.

Figure 4:
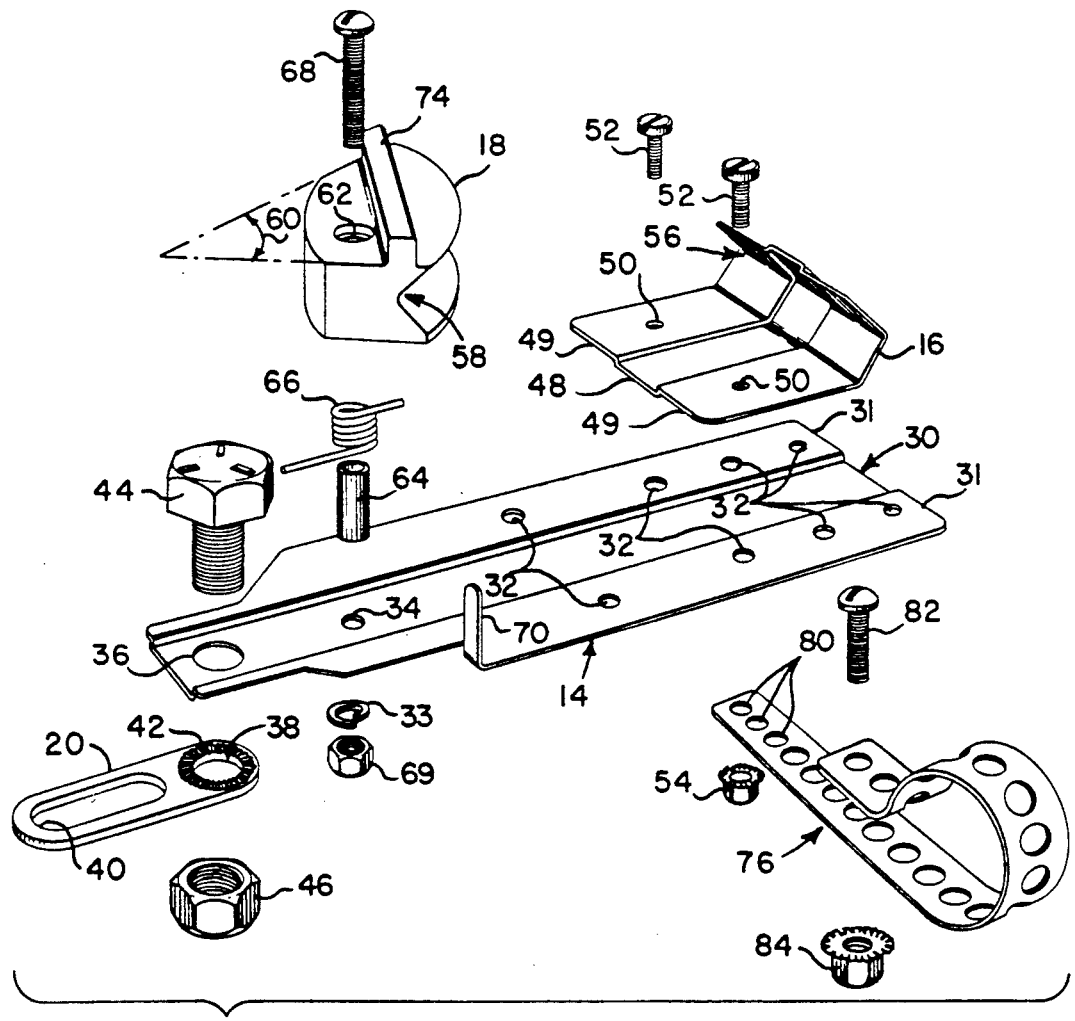
FIG. 4 is an exploded perspective view, on an enlarged scale, of the mounting bracket illustrated in FIGS. 1-3.

The universal mounting bracket 10 of the invention is best described in detail with reference to FIG. 4 where it is shown in exploded perspective view and on an enlarged scale. The base plate 14 of the universal mounting bracket 10 preferably is formed with a reinforcing channel 30 along its axial length, substantially as shown, and delineating a pair of shoulders 31, 31. A plurality of spaced mounting means 32 are provided in the base plate 14 in the form of pairs of apertures straddling the channel 30 and formed essentially centrally in the shoulders 31, 31 of the plate 14. A pair of holes 34 and 36 are formed centrally in the channel 30. The smaller hole 34 is designed to secure the cam member 18 therein, while the larger hole 36 is designed to mount thereto an extension arm 20 provided with a hole 38 in one end and a slot 40 in the other end. Either the hole 36 or the slot 40 of the extension arm 20 can serve as the means to secure the mounting bracket 10 to the motorcycle 22 or the scooter 24 or the like, as more fully described below, As noted, the hole 38 is provided with serrations 42 on its side facing the underside of the base plate 14. In like manner, the large hole 36 also is provided with serrations on its underside facing the serrations 42 about the hole 38. It is with the aid of these opposed serrations 42, and a bolt 44 and a nut 46, that the angular attachment of the extension arm 20 to the base plate 14 is securely effected, observe FIG. 6.

The vise 16 preferably also is formed with a central reinforcing channel 48 separating a pair of shoulders 49, 49. A pair apertures 50, 50 are formed in the shoulders 49, 49 and cooperate with one of the plurality of spaced mounting means whereby, with the aid of a pair of bolts 52 and a pair of nuts 54 (only one being visible), the vise 16 can be secured to the plate 14 at varying distances from the cam member 18. The vise 16 is further formed with the V-groove 56 designed to grip one leg of the rigid U-shaped shackle 26 of the U-lock 12. The V-groove 56 can be formed with an angle from about 60° to about 120° and preferably is about 90°, substantially as shown. Preferably, both the base plate 14 and the gripping vise 16 are formed of the same material, which may be either metal, such as carbon-reinforced steel, or hard plastic, such as nylon or delrin.

The cam member 18 is, however, preferably formed of a hard plastic, such as nylon or delrin, and with a V-groove 58. The V-groove 58 is formed angularly in the side of the cam member 18, with the sides thereof defining an angle 60, defined by an arrow. This angle 60 may vary from about 35° to about 55° and preferably is about 45°, substantially as shown. The cam member 18 furthermore is formed with a transverse bore 62 at a location eccentric to the angular V-groove 58. It is this eccentric location of the bore 62 that allows for the releasably holding of the rigid U-shaped shackle 26 of the U-lock 12 therebetween, as will be more evident from the description below. The bore 62 is formed to accommodate a bushing 64, a torsion spring 66 disposed about the bushing 64, and a bolt 68, by means of which the cam member 18 is mounted, via the hole 34, and with the aid of a washer 33 and a nut 69, to the base plate 14. Due to the action of the torsion spring 66, urging the cam member 18 in a clockwise direction, the cam member 18 is mounted for limited rotational displacement counterclockwise from a position of rest where the right side of the cam member 18 abuts a stop 70. This limited rotational displacement counterclockwise is indicated by an arrow 72, observe FIG. 6, and ranges from about 140° to about 170° and is preferably about 150°. Preferably, the bushing 64 is formed of brass and the torsion spring 66 of steel wire. The free top side of the cam member 18 is provided with a projecting handlebar 74, by means of which the cam member 18 can be turned counter clockwise from its normally restful position against the stop 70. The stop 70 preferably is formed integral with the base plate 14, as shown. If desired, the stop can also be formed by a pin (not shown) being secured to the base plate 14, as for example by a screw or the like.

Figure 5:
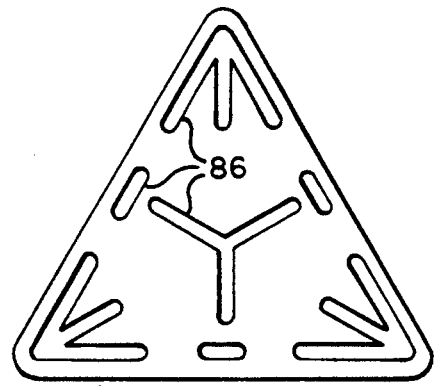
FIG. 5 is a plan view of one alternate component part of the mounting bracket of FIG. 4.

Preferably, the means for securing the bracket 10 of the invention to a vehicle, such as the motorcycle 22 or the scooter 24, also includes a flexible strap 76 or a universal fastening plate 78 illustrated in FIG. 5. The function of the strap 76 or the plate 78 is to provide a second point of anchoring the universal mounting bracket 10 to the particular vehicle. The strap 76, which preferably is formed of a flexible metal, such as aluminum, is formed with a plurality of apertures 80. One of the apertures 80 at one end of the strap 76 preferably is used for attaching the strap 76 to the base plate 14 via the bolt 52 and nut 54, while the free end of the strap 76 can be wrapped around a part of the vehicle and, whenever possible, is secured to itself by a further bolt 82 and nut 84. If the construction, shape and contour of the vehicle so suggests, the alternate universal fastening plate 78 can be used in lieu of the strap 76. The plate 78 preferably also is formed with a plurality of varied apertures 86 formed in its triangularly shaped surface, substantially as may be observed in FIG. 5. It is to be understood that a corner aperture 86 can be used to secure the plate 78 to the base plate 14 via the bolt 52 and nut 54, while another aperture 86 can be fastened, as by another bolt or screw, not shown, to a part of the vehicle in question.

Figure 8:
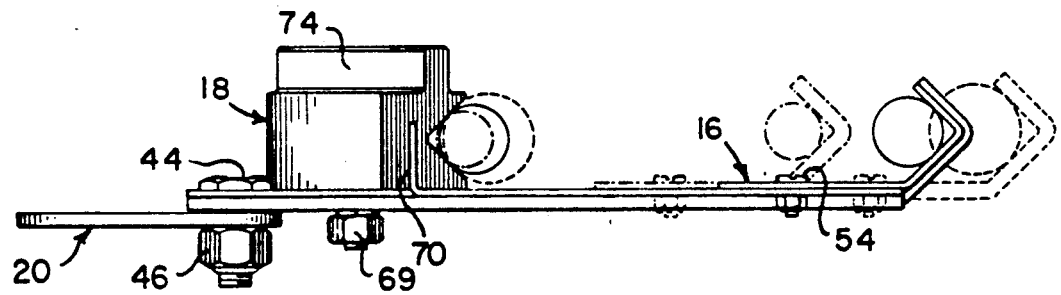
FIG. 8 is a view similar to FIG. 7 but illustrating the bracket releasably securing therein a U-shaped shackle shown in phantom lines and, also illustrating in phantom lines the adjustability of the bracket according to the invention releasably to hold therein U-shaped shackles of U-locks of various sizes and dimensions.

A user of a universal mounting bracket 10 first needs to determine as to where the gripping vise 16 is to be secured to the mounting plate 14. The position of the vise 16 on the plate 14 is, of course, dictated by the size of the particular U-lock 12 the user has, more specifically, the distance separating the legs of the U-shaped shackle 26 from one another. This is illustrated in FIG. 8. As will be observed, the adjustment is not dependent on the thickness of the legs of the shackle, since the opposed V-grooves 56 and 58 of the vise 16 and the cam member 18 respectively do accommodate thicknesses ranging from about ½" to about ¾".

Figure 6:
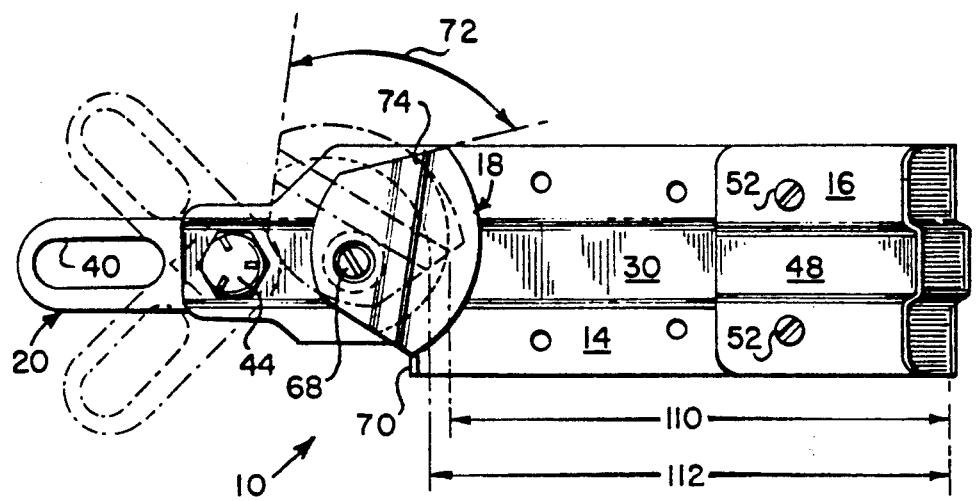
FIG. 6 is a plan view of an assembled universal mounting bracket according to the invention and illustrating, in phantom lines, the operative motions of two components thereof.
Figure 7:
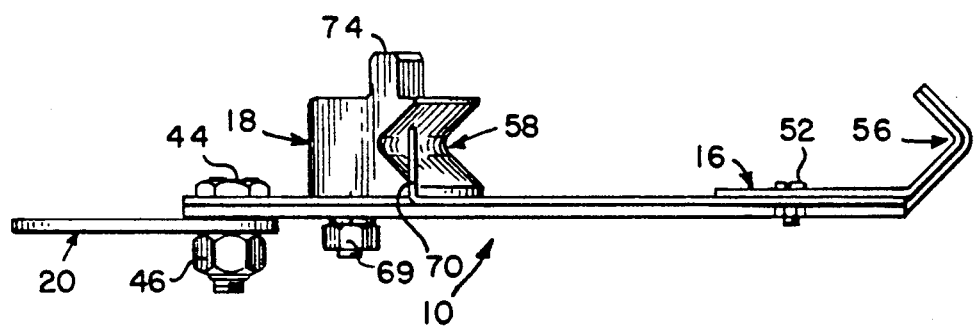
FIG. 7 is a side elevation of the universal mounting bracket of FIG. 6.

With the gripping vise 16 now properly secured to the plate 14, as illustrated in solid lines in FIGS. 6–8, the user next needs to take a look at his particular vehicle, say for example, the motorcycle 22 illustrated in FIG. 1. As well known to motorcyclists, motorcycles come in various shapes and sizes and exhibit significant structural variations as well. Of late, most manufacturers of motorcycles have opted for streamlining their products to enhance their aerodynamic performance and appearance. The streamlining also involved the extensive use of molded plastic parts to enclose, where practicable, as much of the construction of the motorcycle as possible. Such extensive use of molded plastic parts in hiding the underlying construction of the motorcycle makes it difficult for the user to find structurally sound and otherwise convenient locations at which to secure the universal mounting bracket 10 of the invention to the motorcycle 22. In FIG. 1, three such mounting locations are illustrated, only one of which requires the use of the extension arm 20. This location is illustrated centrally in FIG. 1 and also on an enlarged scale in FIG. 2. Here, the attachment of the universal mounting bracket 10 is effected to a foot peg 90 provided to support a foot rest 92 on the vehicle for the right foot of a passenger. The flexible strap 76 is shown as being wrapped on a further structural part 94 of the motorcycle 22.

A second mounting, without the use of the extension arm 20, is illustrated in FIG. 1 on the right to the central location, just described. There, an engine mount bolt 96 is used as one anchoring point about the larger hole 36 forward in the channel 30 of the base plate 14. The second supporting anchor is effected via the flexible strap 76 being mounted about another structural segment 98, as shown. A third mounting, also without the use of the extension arm 20, is illustrated in FIG. 1 to the left of the central location. In this third illustration for mounting the bracket 10, a bolt 100 of a rear carrier rack 102 is utilized as one anchoring point, while the flexible strap 76 is wrapped around a rear projection 104. It is to be understood that these are but representative of locations with respect to the illustrated motorcycle 22 and that other and perhaps more convenient locations may suggest themselves with different structures of a particular motorcycle design.

Figure 2:
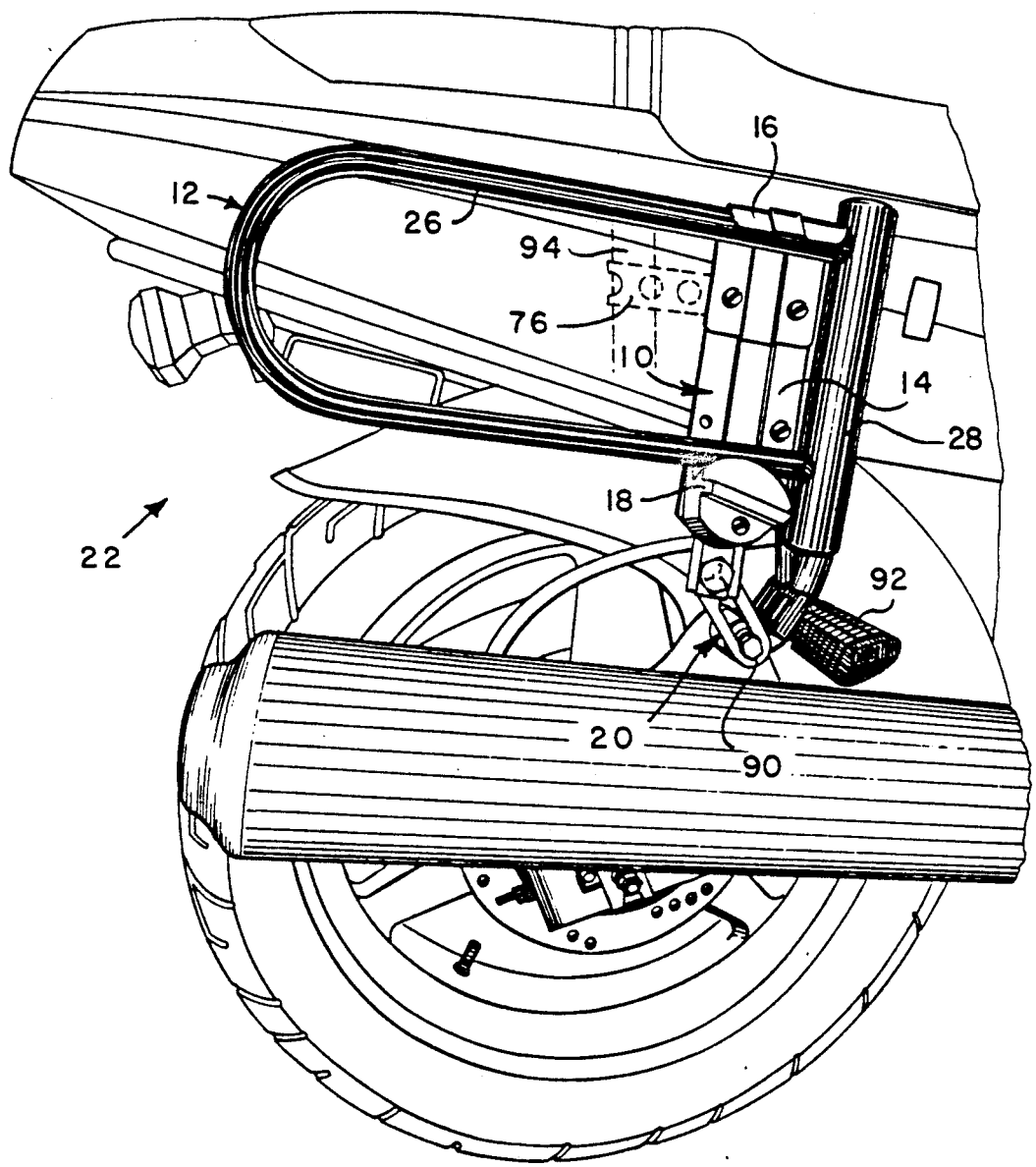
FIG. 2 is a fragmentary perspective view, on an enlarged scale, of the motorcycle illustrated in FIG. 1 and illustrating in more detail one of the three different mountings of the universal mounting bracket thereto, with the bracket releasably securing a rigid U-lock therein.
Figure 3:
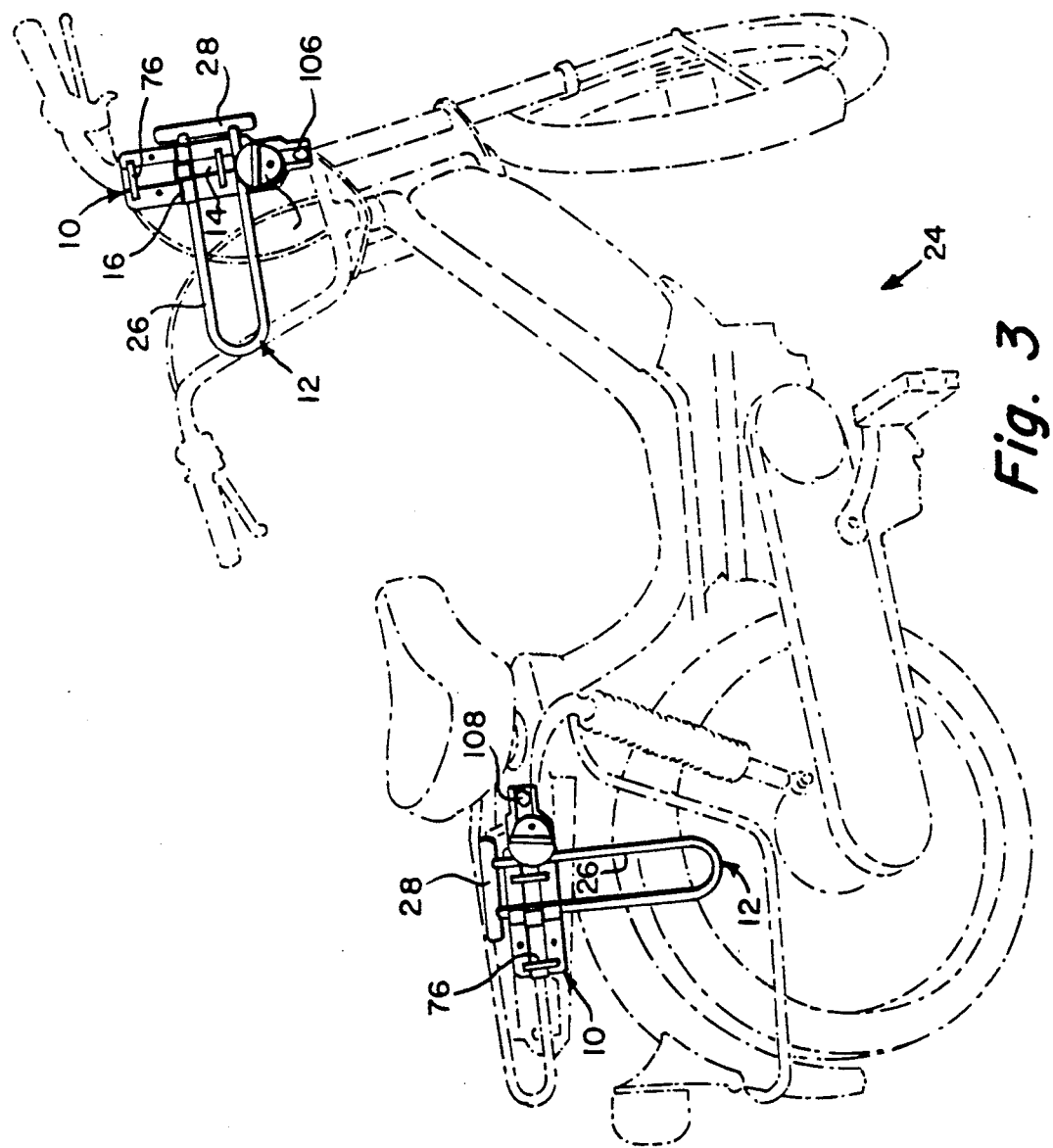
FIG. 3 is a view similar to FIG. 1 but it illustrates the mounting, at two locations, of a universal mounting bracket made according to the invention and shown releasably securing a rigid U-lock to a scooter shown in phantom lines.

In FIG. 3, there are illustrated two convenient locations for securing the universal mounting bracket 10 to a scooter 24. One location is about the handle bar of the vehicle, and a second location is to the rear carrier rack thereof. In both instances, the portable extension arm 20 is not utilized. Rather the mounting bracket 10 is secured to a bolt 106 of the handle bar, or to a bolt 108 of the rear carrier rack, with the flexible strap 76 wrapped around either the handlebar or the carrier rack. It will be noted that the U-lock 12 illustrated in FIG. 3 features a rigid U-shaped shackle 26 which is long and narrow as is customary for this type of vehicle, as opposed to motorbikes, requiring the heavier and wider U-locks illustrated in FIGS. 1 and 2. It will also be noted that, to accommodate these long and narrow U-locks 12, the position of the gripping vise 16 on the base plate 14 has been previously adjusted, as above described.

Once the universal mounting bracket 10 is properly secured to the vehicle, be it a motorcycle 22 or a scooter 24, its operative use is as follows and as best described with reference to FIGS. 6–8.

The universal mounting bracket 10 has been designed both for adjustability to securely retain U-locks 12 of various sizes as above mentioned, as well as for ease in securing a U-lock 12 therein and in removing a secured U-lock 12 therefrom. The adjustability is effected through the positioning of the gripping vise 16 with respect to the cam member 18. With the adjustability selected as shown in solid lines in FIGS. 6–8, the mounting bracket 10 works as follows.

FIGS. 6 and 7 illustrate the position of rest of the cam member 18, with its clockwise rotation under the urging of the torsion spring 66 being arrested by the stop 70. In this position of rest, the distance, as indicated by an arrow 110, separating the opposed V-grooves 56 and 58 of the vise 16 and cam member 18 is the shortest. This is the position assumed by a mounting bracket 10 with no U-lock 12 being held therein. In FIG. 8 is illustrated a second position, a gripping position in which the distance, as indicated by an arrow 112, is near its shortest. This variation in the distance separating the V-grooves 56 and 58 is, of course, the result of the eccentric mounting of the cam member 18 to the base plate 14 via the transverse base 62 thereof. This second position of the cam member 18 is effected by manually gripping the handle bar 74 thereof and twisting the cam member 18 counterclockwise against the urging of the torsion spring 66, with the range of motion indicated by the arrow 72. Then, with one hand holding the handle bar 74 in this second position, the other hand is used to insert the rigid U-shaped shackle 26 of the U-lock 12 in between the opposed V-grooves 56 and 58 until the cross bar 28 abuts against the mounting bracket 10, as illustrated in FIGS. 1–3. Then, by releasing the hold on the handle bar 74, the cam member 18 is urged clockwise and thereby against the rigid U-shaped shackle 26 to secure the same between it and the gripping vise 16. The cam member 18 thus operated as a convenient spring lock, with an easy on-off action to grip or to release a U-lock 12.

Thus, it has been shown and described a universal mounting bracket 10 for securing a rigid U-lock 12 to a motorcycle, scooter, moped or the like, which bracket 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A universal mounting bracket for a U-lock comprising:
   (a) a base plate having opposed ends and provided with a plurality of fixedly spaced mounting means therebetween;
   (b) a gripping vise removable secured to said base plate at one end thereof at one end of said plurality of fixedly spaced mounting means;
   (c) a cam member mounted to said base plate for limited rotational displacement about an axis normal to said base plate at the other end thereof;

(d) said gripping vise and cam member designed for securing said U-lock therebetween; and
(e) means for securing said bracket to a motorcycle scooter, moped or bicycle;
(f) said gripping vise formed with a V-groove;
(g) said base plate formed with a reinforcing channel along its axial length, and wherein said plurality of fixedly spaced mounting means are arranged in pairs along the axial length of said base plate, and wherein said gripping vise is provided with attaching means to secured said vise to said base plate at one of said plurality of spaced mounting means, said attaching means matching said pairs of mounting means of said base plate.

2. The universal mounting bracket of claim 1 wherein said securing means includes an extension arm mounted with limited angular adjustment to said base plate adjacent said cam member.

3. The universal mounting bracket of claim 2 wherein said securing means further includes a strap secured to said base plate adjacent said gripping vise.

4. A universal mounting bracket for a U-lock comprising:
(a) a base plate provided with a plurality of spaced mounting means;
(b) a gripping vise removable secured to said base plate at one end thereof at one of said plurality of spaced mounting means;
(c) a cam member mounted to said base plate for limited rotational displacement at the other end thereof; and
(d) means for securing said bracket to a motorcycle, scooter, and moped;
(e) said base plate formed with a reinforcing channel along its axial length;
(f) said securing means including an extension arm mounted with limited angular adjustment to said cam member;
(g) said plurality of spaced mounting means being arranged astride of said axial reinforcing channel and, a pair of apertures formed in said axial reinforcing channel.

5. The universal mounting bracket of claim 4 wherein said extension arm is formed with a mounting aperture and a mounting slot.

6. The universal mounting bracket of claim 5 wherein said mounting aperture of said extension arm and one of said pair of apertures disposed in said axial reinforcing channel are serrated in opposed relationship.

7. A universal mounting bracket for a U-lock of the type including a U-shaped shackle and a cross bar, said bracket comprising:
(a) a base plate formed with a channel along its axial length and provided with a plurality of spaced mounting means straddling said channel and a pair of holes in said channel at one end thereof;
(b) a vise provided with attaching means to be secured thereby to said base plate at one of said plurality of spaced mounting means;
(c) a cam member mounted to said base plate for limited rotational displacement within one of said pair of holes formed in said channel thereof; and
(d) means for securing said bracket to a motorcycle, scooter, moped or bicycle.

8. The universal mounting bracket of claim 7 wherein both said vise and cam member are formed with respective V-grooves, said respective V-grooves designed cooperatively to hold said U-shaped shackle of said U-lock securely, yet removably therein.

9. The universal mounting bracket of claim 8 wherein said respective V-grooves are each formed with an angle from about 60° to about 120°.

10. The universal mounting bracket of claim 8 further including spring means to urge said cam member into locking engagement with said U-lock.

11. The universal mounting bracket of claim 10 wherein said base plate is further provided with a stop to arrest the rotational displacement of said cam member against the urging of said spring means.

12. The universal mounting bracket of claim 7 wherein said base plate and said vise are formed of metal or plastic and said cam member is formed of hard plastic.

13. The universal mounting bracket of claim 10 wherein said spring means is a torsion spring and wherein the distance separating said vise from said cam member is adjustable by securing said vise to said base plate at one of several locations as indicated by said plurality of spaced mounting means.

14. The universal mounting bracket of claim 7 wherein said securing means includes an extension arm mounted with limited angular adjustment to said base plate adjacent said cam member.

15. The universal mounting bracket of claim 7 wherein said securing means further includes a strap secured to said base plate adjacent said gripping vise.

16. The universal mounting bracket of claim 14 wherein said extension arm is formed with a mounting aperture and a mounting slot.

17. The universal mounting bracket of claim 14 wherein said mounting aperture of said extension arm and one of said pair of apertures disposed in said axial reinforcing channel are serrated in mutually opposed relationship.

18. The universal mounting bracket of claim 7 wherein said securing means further includes a mounting plate of triangular shape and provided with a plurality of mounting slots.

19. In combination a two-wheeled vehicle and a universal mounting bracket for a U-lock to said vehicle comprising:
(a) a base plate;
(b) a gripping vise secured to said base plate at one end thereof;
(c) a cam member mounted to said base plate for limited rotational displacement at the other end thereof;
(d) an extension arm formed with a mounting aperture and a mounting slot and secured via said aperture and with limited angular displacement to said base plate adjacent said cam member; and
(e) means, including an extension arm, for securing said bracket to a structural protrusion of said vehicle;
(f) a plurality of spaced mounting means on said base plate arranged in pairs along the axial length thereof; said gripping vise being provided with attaching means matching said pairs of mounting means of said base plate;
said pairs of mounting means are arranged astride of said axial reinforcing channel, and, a pair of apertures formed in said axial reinforcing channel.

20. In combination, a two-wheeled vehicle and a universal mounting bracket for mounting a U-lock to said vehicle comprising:

(a) a rectinlinear base plate having opposed ends and provided with a mounting aperture;
(b) a gripping vise removable secured to said base plate at one end thereof;
(c) a cam member mounted to said base plate for limited rotational displacement about an axis normal to said base plate at the other end thereof; and
(d) means for securing said bracket via said mounting aperture to a structural protrusion integral of said vehicle;
(e) said vise and said cam member formed with respective V-grooves;
(f) said respective V-grooves designed cooperatively to hold a U-shaped shackle of said U-lock securely, yet removable therein;
(g) said securing means including a rectilinear extension arm mounted with limited angular adjustment to said base plate adjacent said cam member; and a strap secured to said base plate adjacent said gripping vise, said strap formed of one of a group consisting of stainless steel and nylon.

21. The combination of claim 20 wherein said securing means includes a mounting plate of triangular shape and provided with a plurality of mounting slots.

* * * * *